United States Patent [19]

Namura et al.

[11] Patent Number: 5,965,251

[45] Date of Patent: Oct. 12, 1999

[54] LAMINATED FOAM SHEET AND THE MOLDED BODY THEREOF FOR VEHICLE INTERIOR

[75] Inventors: Kiyoyuki Namura; Tatsuro Fushimi, both of Osaka, Japan

[73] Assignee: Kaneka Corporation, Osaka, Japan

[21] Appl. No.: 08/779,950

[22] Filed: Dec. 23, 1996

[51] Int. Cl.⁶ ........................................................ B32B 3/26
[52] U.S. Cl. .................... 428/318.4; 428/308.4; 428/318.6; 428/319.3; 428/413; 428/515; 521/146
[58] Field of Search ................................ 428/413, 308.4, 428/318.4, 318.6, 319.3, 515; 521/146

[56] References Cited

U.S. PATENT DOCUMENTS

| | | |
|---|---|---|
| 4,835,201 | 5/1989 | Bopp . |
| 5,393,603 | 2/1995 | Toyoda et al. ................... 428/316.6 |
| 5,415,906 | 5/1995 | Miyakawa et al. ................ 428/36.4 |
| 5,559,186 | 9/1996 | Fujii et al. . |

FOREIGN PATENT DOCUMENTS

| | | |
|---|---|---|
| 4-11162 | 1/1992 | Japan . |
| 6-344483 | 12/1994 | Japan . |
| A-07-87986 | 10/1996 | Japan . |

*Primary Examiner*—John M. Cooney, Jr.
*Attorney, Agent, or Firm*—Nikaido, Marmelstein, Murray & Oram LLP

[57] ABSTRACT

The present invention provides a laminated foam sheet for car interior comprising a foamed core layer of modified polyphenylene ether resin(I) and film layer(s) of thermoplastic resin laminated thereon, characterized in that the glass transition temperature of the thermoplastic resin of said film layer is lower than that of the modified polyphenylene ether resin(I) of said foamed core layer and makes it possible to obtain molded bodies in a simple manner using the laminated foam sheet. Since the molded bodies obtained by the present invention have the superior characters of heat resistance, rigidity, light weight and good heat insulation, they can be appropriately used as the car interiors such as the material for the ceiling and door trims.

24 Claims, 1 Drawing Sheet

LAMINATED FOAM SHEET AND THE MOLDED BODY THEREOF FOR VEHICLE INTERIOR

FIELD OF THE INVENTION

This invention relates to laminated foam sheets and molded bodies therefrom for the interiors of vehicles, e.g., cars especially to laminated foam sheets and molded bodies for headliners. More particularly it relates to laminated foam sheets and molded bodies for car interiors, which have superior properties in heat-resistance and in light weight.

BACKGROUND OF THE INVENTION

So far, as the materials of car interiors especially as the materials for the headliners, molded bodies from a sheet laminated with a film layer in the desired shape have been widely used, which have been molded from base materials the main components of which are foamed thermoplastic resin laminated with urethane foam or from sheets of foamed styrene- maleic acid copolymer layer, both sides of which are laminated with films of styrene- maleic acid copolymer. These materials for car interiors are light-weight are good heat insulators and have superior moldability.

However, the materials for car interiors, especially the materials for the headliners so far used, have a defect in heat resistance. Thus, when these materials are held in a high temperature for long time, they are often hung down by their own weight or deformed. For solving these problems, the composite materials of the inorganic glass fibers and the plastics are used as the materials for the car interiors.

But though these composites can sustain the heat resistance, they have the problems that the weight cannot be reduced, it is difficult to recycle the materials due to the glass fibers and the cost becomes high.

Headliners molded from sheets of foamed modified polyphenylene ether, both sides of which are laminated with a film layer of modified polyphenylene ether, are proposed as headliners which have such properties as improved heat resistance, light weight and recyclable character [JITSUKAI-HEI-4(1992)-11162)(Unexamined Japanese Utility Model Application)]

Since the headliners from this modified polyphenylene ether(PPE) resin are superior in heat resistance and are light-weight, it is said that the phenomena of the hanging down by its weight under high temperature can be improved.

However, since the requirements for heat resistance, light weight and cost of the headliners, recently, become more severe, the laminated foam sheet from the above mentioned modified PPE resin has become insufficient to fulfill the market requirement and is required to be improved further. For example, the molded body from the laminated foam sheet is still insufficient in heat resistance. And, since there are the residual strains after molding, deformation occurs due to the relaxation of the strain when they are kept under an atmosphere of high temperature (for example, 80° C.) for a long time.

Taking into consideration these situations, the present invention provides a laminated foam sheet and molded body for car interiors which is of low cost and easy to produce, especially the headliners, which have a superior heat resistance (heat and deformation resistance) in addition to the characters of light weight, high heat insulation, good heat resistance, easy moldability and the easy recycling.

SUMMARY OF THE INVENTION

The present inventors have found that the residual strain in the headliners can be reduced and the headliners, which have the characters of light weight, unusually high heat resistance, dimensional stability, moldability, impact resistance, sound insulation, heat insulation and low cost, can be obtained by making the glass transition temperature of the thermoplastic resin in the film layer lower than that of the resin of the foamed core layer, after trying many methods to make the molded bodies for car interiors, which have superior heat resistance and light weight and which further can be produced with a low cost and easily.

Thus, this invention is related to the laminated foam sheet and the secondary molded body for car interiors from said laminated foam sheet where the glass transition temperature of the thermoplastic resin in the film layer is lower than that of the modified PPE resin(I) in the laminated foam sheet, which is produced by laminating the film of a thermoplastic resin on one side or the both sides of the foamed core layer made of modified PPE resin(I).

BRIEF DESCRIPTION OF DRAWING FIGURES

Figure 3:
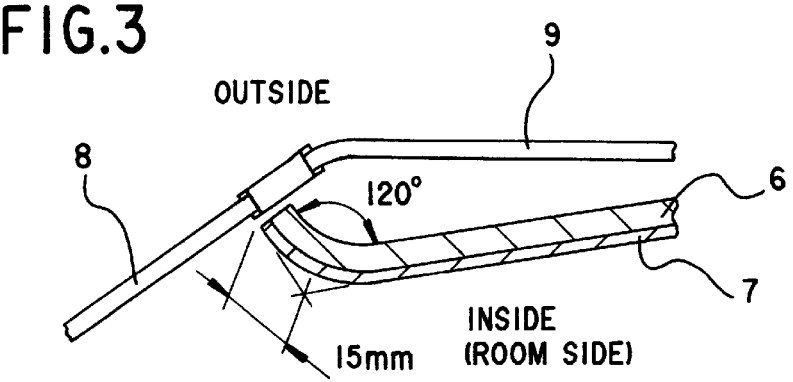

FIG. 3 is a diagram to show the upper part near the car front glass which is mounted with the molded body from the sheet having the film layer on only one side, which were obtained in the examples and the references, in which reference number 6 represents the core layer of the modified PPE resin(I); reference number 7 represents the film layer of the modified PPE resin(II); reference number 8 represents the front glass; and reference number 9 represents the roof.

DETAILED DESCRIPTION OF THE INVENTION

The laminated foam sheet for car interiors proposed by the present invention is a laminated foam sheet, produced by laminating film of a thermoplastic resin, the glass transition temperature of which is lower than that of the modified PPE resin(I), on at least one side of a foamed core layer which comprises the modified PPE resin, and the molded bodies for the car interiors are obtained by molding them.

Figure 1:
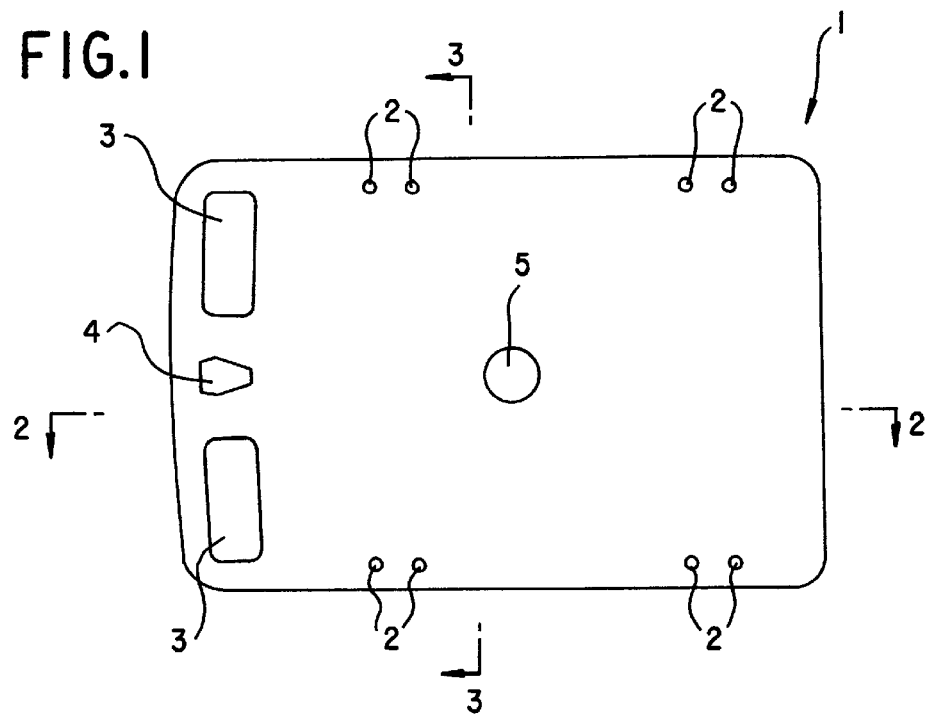
FIG. 1 is a projected diagram to explain the planar shape after trimming by punching the molded headliners obtained in the examples and the references.
Figure 2:
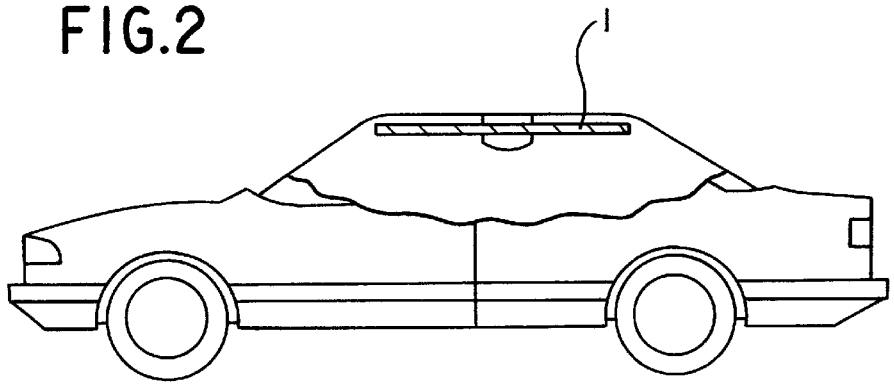
FIG. 2 is an open diagram to show the state where the headliner, which is one of the molded bodies for the car inner interiors, is mounted to the car.

An example of the shaped body is shown in FIG. 1. In FIG. 1, 1 is the molded headliner, 2 the attaching hole for assist grip, 3 the attaching hole for the sun visor, 4 the attaching hole for the room mirror and 5 the attaching hole for the room lamp. FIG. 2 shows the state that the molded headliners, 1, is attached to the room side.

The foamed core layer of the above mentioned modified PPE resin is the fundamental layer of the laminated foam sheet for the car interiors. And since this layer is comprised of the modified PPE resin, the good characters in the heat resistance and moldability are obtained, and the laminated foam sheet of good heat resistance can be easily molded. Further since this layer is a foamed layer, the light weight and the good sound insulation are provided. Further, since the density of the foamed core layer is small, the amount of the resin used becomes small and the car interior becomes competitive in cost.

The modified PPE resin(I) is a resin composition comprising PPE and polystyrene(PS) resin. The modified PPE resin(I), which is used to make the foamed core layer above mentioned, is a graft copolymer or a block copolymer obtained, for instance, by polymerizing the monomers, the main component of which is the styrene derivative monomer, in the presence of the PPE resin, or a mixture of a PPE resin and a PS resin as described below. Of these modified PPE resins, a mixture of PPE and PS is preferable.

Examples of the modified PPE resin are blends of PPE resin and the families of polystyrene, graft or/and block copolymers of PPE resin, mixtures of PPE resin and graft or/and block copolymers of PPE resin, mixtures of PS resin and graft or/and block copolymers of PPE resin, and mixtures of PPE resin, PS resin and graft or/and block copolymers of PPE resin.

Within these examples, the mixture of PPE resin and PS resin is preferred from the stand point of easy production.

Examples of the before mentioned PPE resins are poly (2-6 dimethyl-1,4 phenylene ether), poly(2-methyl-6-ethyl-1,4-phenylene ether), poly(2,6-diethyl-1,4-phenylene ether), poly(2-methyl-6-n-propyl-1,4-phenylene ether), poly(2-methyl 6-n-buthyl-1,4-phenylene ether), poly(2-methyl 6-chloro-1,4-phenylene ether), poly(2-methyl-6-bromo-1,4-phenylene ether) and poly(2-ethyl-6-chloro -1,4-phenylene ether). These polymers can be used individually or in combinations. Within these examples, poly(2,6-dimethyl-1, 4-phenylene ether) is preferred from the points of the wide uses of the raw materials and the cost. Further in the case which intends to give the fire retarding nature to the resin, poly(2-methyl-6-chloro-1,4-phenylene ether), poly(2-methyl-6-bromo-1,4-phenylene ether) and poly(2-ethyl-6-chloro-1,4-phenylene ether) are preferred.

The examples of PS resin which comprise mixtures with PPE resin or/and PPE-St. copolymer, are the resin from styrene and its derivative, examples of which are α-methyl styrene, 2,4-dimethyl styrene, monochlorostyrene, dichlorostyrene, p-methyl styrene, ethyl styrene and etc. Thus the said PS resin is not only the homopolymer of styrene and its derivatives but also the copolymer from the other monomers. The other monomer content in the copolymer, which can copolymerize with styrene or its derivatives, is in the ranges of 0 to 40 weight %. Further, as in the case of the high impact polystyrene, the polymers can be used, which are obtained under the existence of the synthetic rubber or gum latex when the styrene or its derivatives are polymerized.

Examples of the comonomer, which can copolymerize with styrene or its derivatives, are the nitrile compounds such as acrylonitrile and methacrylonitrile, the alkylacrylates such as ethyl(meth) acrylate, ethyl(meth)acrylate and butyl(meth)acrylate, the unsaturated carboxy acid or its acid anhydrides such as maleic anhydride and itaconic acid. These can be used individually or in combinations of more two or compounds.

Examples of the said polystyrene resins are polystyrene, the copolymers of α-methylstyrene-styrene, the copolymers of styrene-butadiene represented by high impact polystyrene, the copolymers of styrene-acrylonitrile and the copolymers of styrene-maleic anhydride. Among these, polystyrene is preferred from the points of its wide uses and cost.

Examples of the monomers of the styrene derivatives, which can polymerize or more preferably graft with the before mentioned PPE resins, are styrene, α-methylstyrene, 2,4-dimethylstyrene, monochlorostyrene, dichlorostyrene, p-methylstyrene and ethylstyrene. A single one or combinations of two or more of these can be used. Among these, styrene is preferred from the point of view of its wide uses and cost.

When the monomers of the styrene derivatives polymerize with the before mentioned PPE resins, the comonomers, which can copolymerize with the styrene derivative monomers, can coexist in the range where the styrene derivative monomer are the main components (60 weight %). Examples of such comonomers are nitrite compounds such as acrylonitrile and methacrylonitrile, alkyl(meth) acrylates such as methyl(meth)acrylate, ethyl(meth)acrylate and butyl(meth)acrylate, alkylacrylates such as methylacrylate, ethylacrylate and butylacrylate and the unsaturated carboxyl acids or its anhydrides such as maleic anhydride and itaconic acid. These comonomers can be used individually or as mixtures of two or more.

The method, which polymerizes the styrene derivative monomers or the mixtures of the monomers, the main component of which is the styrene derivative monomer, with before mentioned PPE resins, can be a well known one such as described in TOKUKO-SHO-52(1977)-30991(Published examined Japanese patent application) and TOKUKOSHO-52(1977)-38596(Published examined Japanese patent application) where the monomer was polymerized during agitation at 130 to 200° C. under the conditions of no water and the existence of the organic solvents or no organic solvent after adding the radical initiator and styrene compounds to the said PPE resins.

In the modified PPE resin comprising phenylene ether and styrene derivative monomer(which can contain 0 to 40 weight % comonomers being able to copolymerize with styrene), the range of PPE content is between 35 and 75 weight %, more preferably between 35 and 60 weight %, and most preferably between 38 and 58 weight %. The styrene derivative monomer content is between 25 to 65 weight %, more preferably between 40 to 65 weight %, and most preferably between 42 and 62 weight %.

When the ratio of the PPE resins in the modified PPE is too small, the heat resistance of the resin becomes too low, while when the ratio is too large, the viscosity of the resin at heating increases and it becomes difficult to foam and mold the resin.

The thickness of the foamed core layer from the modified PPE (the foamed core layer) based on the raw material of the modified PPE is between 1 and 5 mm, more preferably between 1.5 and 3.5 mm, and the expansion rate of it is between 3 and 20, more preferably between 5 and 15, and the average cell diameter of it is between 0.05 and 0.9, more preferably between 0.1 and 0.7 mm, and the ratio of the closed cells is above 70%, more preferably above 80%. The content of the residual volatile component in the foamed layer is between 1 and 5 weight % of the total weight of the core layer, more preferably between 2 and 4 weight %. The residual content of the volatile component is measured by weighing the samples before and after heating it at the temperature between the softening point of the modified PPE(I) and the decomposition temperature and evaporating the volatile component or by gas chromatography.

When the thickness of the foamed core layer is smaller than 1 mm, it occurs sometimes that the sheet of the laminated foam layer is not appropriate as the car interior due to lack of strength and heat resistance. While in the case of the above 5 mm, the moldability sometimes becomes worse since the heat cannot transfer into the center of the core from the modified PPE layer and the resin cannot be warmed sufficiently during molding. Also in the case when a long heating time is used to provide enough heating, it sometimes becomes difficult to obtain the commercially usable products, since the phenomena that the cells in the surface of the core layer may be broken and the-like may occur. Also in the case that the expansion ratio in the foamed layer is smaller than 3, the damage of the products by bending easily occurs due to the lack of the flexibility, or it becomes difficult to obtain the light products. In the case that the expansion ratio is over 20, the moldability tends to be less due to the lack of strength and the phenomena that it becomes difficult for the heat to reach the center. Further in the case that the cell diameter is smaller than 0.05 mm, it becomes difficult to obtain sufficient strength, while in the case that the cell diameter is larger than 0.9 mm, the heat resistance tends to be less. Further in the case that the ratio of the closed cells is below 70%, lack of the heat resistance and rigidity occur and the moldability tends to be less since the aimed secondary expansion ratio becomes difficult to be obtained even by heating. Further in the case that the residual weight % of the volatile component is less than 1%, it sometimes becomes difficult to mold in a good manner due to the low expansion ratio in the secondary forming, while in the case of above 5 weight %, air pockets may appear between the film layer and the foamed core layer or the dimensional stability tends to be less as time is elapses.

Nuclear agents, impact modifiers, lubricants, antioxidants, antistatic agents, pigments, fire retardants, stabilizers and smell reducing agent can be added to the modified PPE resin which is used as the core layer in the present invention, if necessary.

Examples of the smell reducing agents are the fatty carboxyl acids and the esters of them, the cyclic fatty carboxyl acids and esters of them, the anhydrides of the carboxyl acids and the copolymer of alkenyl aromatic compounds and anhydrides of the acids or mixtures of them. Especially maleic anhydride is preferred in the point of the wide uses. 0.01 to 5 weight parts of the smell reducing agent is used for 100 weight parts of the modified PPE resin.

As mentioned before, the film layer of the thermoplastic resin is laminated on at least one side of the first foamed core layer. Examples of the thermoplastic resin obtained in the film layer are polystyrene resins, modified PPE resins, polypropylene resins, polyethylene resins, polyethyleneterephthalate resins (PET), polybutyleneterephthalate resins, polyamide resins, polycarbonate resins, polyarylate resins, polyimide resins, polyether sulfone resins, polysulfone resins and polyvinylchloride resins. These polymers can be used individually or in combinations of two or more. Among these, polystyrene resin and modified PPE(II) resins are preferred from the points of view of the adhesive character to the foamed core layer and the ease of recycling.

Polystyrene resins used in the film layer are resins, the main component (above 60%, preferably above 70%) of which is resin from styrene or its derivative such as α-methylstyrene, 2,4-dimethylstyrene, monochlorostyrene, dichlorostyrene, p-methylstyrene and ethylstyrene. Therefore, PS resins contain not only the polymer of styrene or its derivatives but also the copolymers which are obtained by copolymerization of styrene or its derivatives with the other comonomer. Further, it can be possible to be a polymer such as the high impact polystyrene (HIPS) obtained by polymerizing styrene or its derivatives under the existence of the synthetic rubber or the latex of the gum, when the styrene or its derivatives is polymerized. As the high impact polystyrene, the well known one can be used and its rubber content is between 1 and 15 weight %.

Examples of the comonomers which can copolymerize with styrene used in the production of the said polystyrene resins are the nitrile compounds such as acrylonitrile and methacrylonitrile, the alkyl(meth) acrylates such as methyl (meth)acrylate, ethyl(meth)acrylate and butyl(meth) acrylate, alkylacrylates such as methylacrylate, ethylacrylate and butylacrylate and the unsaturated carboxyl acids or its anhydrides such as maleic anhydride and itaconic acid. These can be used individually or in combinations of more than two. The range of the weight % of the other comonomer being able to copolymerize is between 0 and 40, preferably between 0 and 30.

The examples of PS resins, which are used in the film layer, are polystyrene, the copolymers of styrene-α-methylstyrene, the copolymer of styrene-butadiene represented by high impact polystyrene and the copolymer of styrene-acrylonitrile. etc. Among these, the polystyrene resins and the high impact polystyrene resin are preferred from the point of view of their wide uses, cost and good nature as impact modifiers. The PS resin of great heat resistance are the copolymers of styrene- the monomers containing the carboxyl acids, examples of which are the coploymers of styrene-maleic anhydride and the copolymers of styrene-itaconic acid.

The before mentioned PS resins can be used as a single manner or in combinations of more than two. Further, the PS resins can be blended with other thermoplastics, the content of which is preferred below 30 weight %. Examples of thermoplastics, which can be blended, are polycarbonate, polyesters, polyolefins such as polyethylene and polypropylene, polyvinylchloride resins such as polyvinylchloride, polyether-sulfone, polysulfone, polyamide and the copolymers of them. The content of the PS resins in the film layer is usually between 70 and 100 weight %, more preferably between 80 and 100 weight %.

The modified PPE resin(II) is a resin composition comprising PPE and PS. The modified PPE resins(II), which are used in the film layer, are the resins obtained the same way as the before mentioned foamed core layer; that is, by polymerizing the monomers, the main component of which is the styrene derivative monomer under the existence of the PPE resins or by mixing the below described resins; that is, the polymer(which may be a graft copolymer or a block copolymer) obtained by the just above mentioned method, PPE resin and PS resin. Examples of the modified PPE thus obtained are the mixture of the PPE resins and polystyrene resins (PS resins), the graft copolymer obtained by grafting the styrene monomer to PPE resins or the block copolymer of them (hereafter called copolymer of PP-St), the mixture of the said copolymer and PPE or PS resins and the mixture of the said copolymer and PPE resins and PS resins. Among these, the mixing resins of the PPE resins and PS resins is preferred from the standpoint of its easy production and etc.

Since the examples of the PPE resins and its preferred one, the examples of PS resins and its preferred one, the examples of the styrene derivative monomers and its preferred one, the examples of the comonomers which can copolymerize with the PS resins or the styrene derivative monomers and the reasons of its uses are the same as the cases of the resins used in the first foamed layer, we omit their explanations.

However, the copolymer of styrene-butadiene represented by the high impact polystyrene is added as a preferred example of the PS resins from a standpoint of the large improved effect in the impact strength, when the mixture of the PPE resins and PS resins are used.

In the modified PPE resin(II), the ratio of the PPE resins and the component of the styrene derivatives monomer (it is possible to contain 10 to 40 weight % of the comonomer which can copolymerize with the styrene derivative monomers) is in the range of not less than 1 and below 35 weight % of PPE resins, more preferably in the range of not less than 1 and below 25 weight %, and most preferably in the range of not less than 1 and below 10 weight %. On the other hand, the content of the styrene derivative monomers in the modified PPE resin(II) is in the range of not less than 65 and below 99 weight %, more preferably not less than 75 and below 99 weight % and most preferably not less than 90 and below 99 weight %.

Since the glass transition temperature of the resins in a film layer must be lower than that of the core layer, it must be X>Y, preferably X−5>Y, more preferably X−10>Y, most preferably X−15>Y, where X is the ratio of PPE resins to PS resins in the modified PPE resins (I) (thus the ratio of PS resin becomes (100−X) %) and Y is the ratio of PPE resins to PS resins in the modified resins(II) (thus the ratio of PS resins becomes (100−Y)%).

When the glass transition temperature of the resin in the film layer is lower than that of the foamed core layer, the superior laminated sheet in moldability and heat resistance can be produced.

According to the studies of the present inventors, when the car is held in a temperature for a long time after installing the car interiors such as the headliners, the deformations in the front parts and the like are occurring due to the strain at the molding time, since the molded bodies are deformed by the relaxation of the residual strain under the high temperature when there are residual strain in the molded bodies. According to the present invention, the thermal deformation of the molded bodies can be reduced by making the glass transition temperature of the resin in the film layer lower than that of the core layer. Thus, even the temperature of the laminated and foamed layer at the molding is increased so as to remove the residual strains in the film layer, the cells in the foamed core are never broken and the phenomena such as the surface roughening and the peeling off of the film layer never occur.

As mentioned above, it is necessary that the glass transition temperature of the resins in the film layer, Tg(l), and that of the foamed core layer, Tg(f), must satisfy the relation Tg(f)>Tg(l), preferably Tg(f)−5>Tg(l), more preferably Tg(f)−10>Tg(l), most preferably Tg(f)−20>Tg(l).

In the laminated foam sheet of the present invention, the film layer can be laminated either on one side of the foamed core layer or both sides of it. The thickness of the film layer is in the range of 50 to 300 μm and 75 to 200 μm is preferred. In the case that the thickness of the said film layer is thinner than 50 μm, the strength, rigidity and heat resistance become inferior, and, in the case of thicker than 300 μm, the moldability tends to worsen.

When the film layers are laminated on both sides of the foamed core layer, the characters such as the rigidity, heat resistance and the dimensional stability are further improved. In this case, the thickness of the film layer is in the range of 50 to 200 μm. Further, in the case that the film layer is laminated on only one side, the thickness of the film layer is in the ranges of 75 to 300 μm. In the case that the film layer is laminated on the only one side, the merits that the production process can be simplified, that its cost can be reduced and that the weight of the sheets obtained becomes light result.

In the case that the before mentioned film of a thermoplastic layer is laminated, impact modifiers, fillers, lubricants, anti-oxidants, antistatic agents, pigments, stabilizers, smell reducing agents and etc. can be added to the modified PPE resin which is used in the core layer. These can be used individually form or in the form of combinations of two or more.

The impact modifiers mentioned above are effective to prevent the breakage of the film layer in the punching processes of laminated and foam body and in the transport of the laminated foam sheets or the molded body.

As the impact modifiers mentioned above, there is no limit if its effects can manifest by mixing them with the thermoplastic resins. The impact modifiers may be the components which manifest its effects as an impact modifiers through modifications by polymerization. For example, shock resistance can be given to the film layer by introducing impact modifiers such as high impact polystyrene into the resins of the film layer.

As the impact modifiers, a natural rubber, a synthetic rubber and a graft polymer which is obtained by grafting a monomer having olefinic double bond such as styrene, methylmethacrylate and etc. around rubber particles, are preferably used.

Examples of rubbers are styrene-butadiene rubber, hydrogenated styrene-butadiene rubber, butadiene rubber, isoprene rubber, ethylene-propylene rubber, copolymers of ethylene-propylene-diene, copolymers of acrylonitrile-butadiene, chloroprene rubber, butyl rubber, urethane rubber, silicone rubber, polysulfide rubber, hydrogenated nitrile rubber, special rubber from polyether, fluorinated rubber, 4 fluorinated ethylene-propylene rubber, acryl rubber, chlorosulfonated polyethylene rubber, epichlorohydrin rubber, propylene oxide rubber, ethylene-acryl rubber, liquid rubber, norbornene rubber, thermoplastic elastomer of polystyrene resin, the thermoplastic elastomer of the olefinic polymer, thermoplastic elastomer of polyesters, thermoplastic elastomer of polyamides, thermoplastic elastomer of 1,2-polybutadiene, thermoplastic elastomer of fluorinated polymer, MBS resins, copolymer of ethylene-vinylacetate and like. These can be used individually or in combinations of two or more. Among these, styrene-butadiene rubber and hydrogenated styrene-butadiene rubber are preferred from the standpoint of good compatibility with PS resins and the modified PPE resins and its wide uses.

The amount of the impact modifiers is in the range of 2 to 25 weight % of the thermoplastic resins, and especially 5 to 20 weight % are preferred. In the case that the content of the modifiers is below 2 weight %, the improving effects of softening and shock resistance of the film layer cannot be made manifest sufficiently and, as the result, it sometimes occurs that the breakage by bending and shock cannot be prevented. Further, in the case that the content of the modifiers is above 25 weight %, a lack of heat resistance and rigidity may occur.

In the case where the thermoplastic resin, which contains the rubber component having the improving effects for shock resistance such as high impact polystyrene, is used as the thermoplastic resin making up the film layer, the total rubber content from the thermoplastic resins (high impact polystyrene) and the impact modifiers (rubber content) is in the range of 2 to 25 weight % of the thermoplastic resin and especially the range of 5 to 20 weight % is preferred. In the case of below 2 weight %, the improving effects of softening and shock resistance of the film layer cannot be made manifest sufficiently and, as the result, it sometimes occurs that the breakage by bending and shock cannot be prevented. Further, in the case that the content of the modifiers is above 25 weight %, lack of heat resistance and rigidity may occur.

Further in order to prevent the breakage of the film layer which occurs in the punching working in the molding process or in the transports, the Izod strength of the thermoplastic resins in the film layer is above 80 J/m, preferably above 120 J/m and most preferably above 170 J/m. The Izod strength is the value measured by nearly the same method as ASTMD 256 with notch.

The flame retardant is effective to improve the flame resistance of the molded body of the car inner interiors.

Examples of the organic flame retardant are organic halogenated compounds, phosphate esters and halogenated phosphate esters, and, among these, the halogenated compounds are the best from the points of wide uses and cost. Examples of the halogenated compounds are tetrabromobisphenol A, 2,2-bis (4-hydroxy-3,5-dibromophenol) propane, hexabromobenzene, tris(2,3-dibromopropyl) isocyanurate, 2,2-bis(4-hydroxyethoxy-3,5-dibromophenyl) propane, decabromodiphenyl oxide, the halogenated polyphosphates, polychloroparaffin, perchloropentacyclodecane, tetrabromocthane, hexabromodecane and the like. Further, chlorinated resins can be used, examples of which are brominated polystyrene and chlorinated polystyrene. Examples of the phosphoric esters are trimethyl phosphate, triethyl phosphate, tricresylphosphate, trixylenylphosphate, cresyl diphenyl phosphate, xylenyldiphenyl phosphate, tri(2,6-dimethylphenyl) phosphate and the like. Examples of the halogenated phosphate esters are tris (chloroethyl)phosphate, tris (β-choloropropyl) phosphatic, tris(dichloropropyl)phosphate, tris (tribromoneopentyl) phosphate and the like.

Examples of the inorganic flame retardant are antimony compounds, aluminum hydroxide, ammonium polyphosphate, magnesium hydroxide, molybdenum oxide, zirconium oxide, silicone oxide, boric acid and the like. The antimony compounds are the best from the points of preventing the deterioration of effects the properties of the raw materials and its large fire retardant effects with the addition of a small amount. Examples of the antimony compounds are antimony trioxide, antimony pentaoxide and the like. These can be used individually or in combinations of two or more. The combination of the halogenated compounds and antimony compounds are preferred from the points of the effects of the flame retardant and etc. The amount of the flame retardant added is in the range of 0.2 to 10 weight parts for 100 parts of the thermoplastics resin. In the case of less than 0.2 weight parts, it sometimes occurs that the effects of the fire retardant do not manifest, and, in the case of more than 10 weight parts, it sometimes occurs that the properties of the resins such as heat resistance are reduced largely.

The fillers mentioned before are effective in improving the strength, rigidity, dimensional stability and the like of the molded body, and the kinds of the fillers used are not limited. Examples of the fillers compounded in the film layer are talc(magnesium silicate), calcium carbonate (heavy, light and glue), mica, magnesium oxide, magnesium carbonate, barium sulfide, calcium sulfide, calcium sulfite, silica, clay, kaolin, white carbon, magnesium hydroxide, carbon black, zeolites, molybdenum and the like. Among these, especially talc, calcium carbonate and mica are preferred.

The added amount of the fillers mentioned above is in the range of 1 to 50 weight parts for 100 parts of the thermoplastic resin and the range of 5 to 40 weight parts is preferred. In the case of less than 1 weight parts, the clear effect of the addition (inorganic) cannot be obtained, and the use of more than 50 weight parts is not preferred, since the viscosity of the resin compounds increases and the load to the extruder increases. Also the impact strength of the formed core layer reduces largely.

The preferred examples of the laminated foam layers, which are made by laminating the film layers of the thermoplastic resin on either one side or both sides of the foamed core layer the modified PPE as mentioned before, is obtained by combining the preferred foamed core layer of the modified PPE mentioned before and the preferred film layer of the thermoplastic resin mentioned before.

The range of L1/L2 is between 0.3 and 1.0 and especially the ranges of 0.4 and 1.0 is preferred, where L1 and L2 are the average length of the cell in the direction of the thickness and width, respectively, which are obtained by measuring these of 10 cells in the section of the molded body using SEM (surface Electron Microscope) or optical microscope. In the case that L1/L2 is less than 0.3 or larger than 1.0, the deformation of the curved parts occurs at a high temperature, since the cells are flat and the cells tend to become spherical at a high temperature. Therefore, problems take place, since the front parts may be deformed, for example, in the case of the molded headliners of cars.

On the cell length L1 in the direction of the thickness observed after heating the samples at 85° C. for 8 hours, the following value is calculated according to the formula:

(L1 before heating–L1 after heating at 85° C. for 8 hours)/L1 before heating×100(%) which is defined as the deformation ratio.

The deformation ratio is below 20%, more preferably below 15% and the most preferably below 10%. In the case that the deformation ratio is larger than 20%, the deformation of the curved parts of the molded bodies occurs at high temperature. For example, the deformation in the front parts after test of the heat resistance takes place in the case of the molded body of the headliners. This causes a problem.

It is possible to make L1/L2 0.3 to 1.0 and make the deformation ratio of L1 stay under 20% by not making the cells in the foamed sheet largely flat and by controlling both the thickness of the laminated and secondary expanded foam sheet and the clearance of the mold. Here, the thickness(t) of the foamed core layer in the laminated and secondary expanded foam sheet is obtained by preheating the sample without die under the same conditions as the mold.

The preferred thickness of the foamed core layer in the molded body, T, is between $0.5t \leq T$ or more preferably $0.7t \leq T$. In the case that T is smaller than 0.5t, the heat resistance may be reduced due to the large residual strains in the foamed core layer of the molded body.

The before mentioned thickness of the foamed core layer in the molded body, T, means that of the thinnest part in the curved part, where the heat resistance (the deformation resistance by heat) is the most important. For example, in the case of the headliners, these places are the curved parts of the front and rear. The thickness of the foamed core layer at the secondary expansion ,t, means that of the laminated and secondary expanded foam sheet obtained after heating the laminated foam sheet without die under the same condition with die and finally cooling the samples. When the thickness is not uniform, the value of t is that measured at the same part as that of T of the foamed core layer.

The relations between the thickness of the foamed core layer of the molded body, T, and the thickness of the foamed core layer of the laminated and secondary expanded foam sheets ,t, can be adjusted by changing the thickness of the molded bodies through adjusting the clearance of the mold at molding time. In the case where the decorative layer is laminated on the laminated foam sheet, the clearance can be adjusted by increasing the thickness of the decorative layer.

The before mentioned relations can be adjusted by changing the thickness of the foamed core layer in the laminated and secondary expanded foam sheet ,t, through changing the thickness of the foamed core layer of the laminated foam sheet or changing the expansion ratio by adjusting the residual volatile contents. The thickness of the laminated foam sheet can be adjusted by changing the drawing speed at production of the foamed sheets. When the laminated foam sheets are thin, the thickness of the foamed core layer in the laminated and secondary expanded foam sheet ,t, becomes thin, while it becomes thick if thick. The adjustments of the residual volatile content can be done by changing the amounts of the foaming agent in producing the foamed sheet or by the method of curing the laminated foam sheet(for example keeping the sheet at the temperature for a several days to several months under the condition that the second expansion does not occur.)

When the residual volatile content is low, the thickness at the second expansion ,t, becomes small.

Thus it is possible to mold as the relation $0.5t \leq T$ can be satisfied by changing the thickness of the foamed core layer at the second expansion ,t, without changing the thickness of the foamed core layer of the molded body, T.

When there is only one mold as in the case of straight molding in a vacuum mold, the thickness of the foamed core layer in the molded body, T, and the thickness of the foamed core layer at the second expansion ,t, become nearly equal, and the preferred results are obtained. This method is one of the best method due to a good fixing of the shaping due to the vacuum mold.

The thickness of the before mentioned secondary expanded foam sheets in the range of 2.0 to 10 mm is preferred and is further preferably between 3.0 and 8 mm. The expansion ratio (the second expansion ratio) is between 5 and 50, more preferably between 8 and 30. The average cell size is between 0.07 and 2.0 mm, more preferably between 0.15 and 1.5 mm. And finally the closed cell ratio is above 60%, more preferably above 70%.

When the thickness of the secondary expanded foam sheet is below 2.0 mm, lack of strength and heat insulation occur and it sometimes happens that they are not appropriate for the headliners. While, in the case of above 10 mm, they are too bulky and the car room tends to become narrow. When the expansion ratio is below 5, breakage and the like by bending sometimes occur due to the lack of flexibility. Above 50, the strength tends to decrease. Further when the cell size is below 0.07 mm, it becomes difficult to get enough strength. Above 2 mm, the heat insulation becomes reduced. Further if the ratio of the closed cells is below 60%, the rigidity becomes reduced. The decorative layer can be laminated on the before mentioned laminated and secondary expanded foam sheets, if necessary. The decorative layer is usually prepared on the film layer, but it may be possible to prepare it on the foamed core layer, which is on the other side of the film layer.

As the raw materials of the said decorative layer, known materials of the decorative layer materials for car interiors can be used, examples of which include woven cloths, non-woven cloths, foamed sheets, resin films and the like. These can be the products of synthetic resin such as polyethyleneterephthalate, polypropylene, polyamides (Nylon), polyacrylonitrile, modified polyacrylonitrile (Kanecalon@) and etc., the products of natural material such as wool or cotton and the products of combinations of these. The foamed resin layer such as urethane, polyolefins and the like can be laminated between the woven cloths or non-woven cloths and the formed and laminated sheets. It is preferred to use the decorative materials to which flame retardant are added, when the headliner of the present invention is required to have a character of flame retardation.

Next, the producing method of the laminated foam sheet for the headliners will be explained.

The foamed modified PPE layer (the foamed layer) used in this invention can be produced by winding up at the rates of 0.5 to 40 m/min. and molding with a mandrel, after adjusting the temperature at the best point for foaming (between 150 to 300° C., especially between 180 to 250° C.) and extruding the mixtures of the PPE resins and PS resins or the PPE copolymer resins grafted with the styrene derivative monomers, which the various additives are added to and are fused and melted in the extruders at the temperature between 150° C. and 400° C., especially between 200 and 350° C. and further are added 1 to 15 weight % of nuclear agents to 100 weight % of the resins under a pressure between 3 and 50 Mpa, especially between 5 and 40 Mpa.

Examples of the nuclear agents used in producing the foamed before mentioned modified PPE resins are nuclear agents of the hydrocarbons and the halogenated hydrocarbons such as butane, propane, pentane, chlorinated methyl, dichloromethane, chlorofluoromethane, dichloroethane, dichlorodifluoroethane and the like. These can be used individually or in combinations of the two or more. Above all, the nuclear agents of the hydrocarbons are preferred from the points of its wide uses and cost.

The laminated foam sheets for the car interiors of the present invention are produced by laminating the film layer of the thermoplastic resin on the before mentioned foamed core layer. Examples of the method for producing these sheets are one which adhere the resins shaped in the film-like forms by the heated rolls on the upper side or the under sides of the pre-foamed shaped and supplied layer or one which coextrude them by using mutilayer extruder. The preferred method is one where the film layer of the compounds supplied from the extruder is laminated on the upper side and/or under side of the foamed core layer which is pre-foamed and is supplied, and is solidified and is fixed to the film layer from the plastic states by a cooling roller. Above all, the method, which laminates in lines by molding the sheets of the first foamed layer and by extruding the film layer, is more preferable from the points that the number of the processes can be reduced and from its cost.

The preferred method, which molds the bodies of the laminated and secondary expanded foam sheet for the car interiors from the obtained laminated foam sheet, is vacuum molding with use of molding dies or an air-aided molding under the controlled temperature, after secondary expansion by heating to the appropriate temperature for molding, for example between 120 to 200° C., through bringing with clump the laminated foam layer to the center of the heating furnace having the heater on both the upper and below sides. The heating time is usually between 10 and 90 sec.

Examples of vacuum molding and air-aided molding are plug molding, free-drawing molding, plug and ridge molding, ridge molding, matched mold molding, straight molding, reverse-draw molding, plug assist molding, plug assist reverse molding and etc.

The molding is preferred to be done, before the cheloid on the surface the laminated foam sheet happens, by heating in the process of the second expansion. According to the studies of the present inventors, the ratio of the closed cell becomes reduced and the lack of the rigidity of the shaped bodies also tends to be reduced, if the molding is done at the condition that the cheloid happens on the surface. The cheloid happens by the breakage of the cell in the foamed core layer, and results in reducing the ratio of the closed cells. The temperatures of the molding dies are usually between 40 and 100° C. By these methods, the molded bodies for the car interiors by the present invention are produced.

The method of producing the car interiors having the decorative layer from the before mentioned laminated and secondly expanded foam sheets is one which adheres the decorative layer with adhesive beforehand to the laminated foam sheets by a heating roll, adhering the decorative layer by a heating roll on the laminated foam sheets which is laminated with the adhesive layer by the binder lamination method or is laminated with the adhesive layer shaped in the film by heat laminated method, adhering the tentatively holding surface layer by a heating roll, adhering the surface layer with adhesive simultaneously when the adhesives are laminated on the laminated foam sheets and similar methods.

Examples of the adhesives are thermo-plastic adhesives, hot-melt adhesives, rubber adhesives, thermo-setting adhesives, monomer reactive adhesives, inorganic adhesives, natural adhesives and the like. Among these, the hot melt adhesives are preferred in the point of easiness.

Examples of the said adhesives are adhesives the main component of which are resins such as polyolefins adhesives, modified polyolefins adhesives, polyurethane adhesives, copolymer adhesives of ethylene-vinylacetate, polyamides adhesives, polyester adhesives, copolymer adhesives of styrene-butadiene, copolymer adhesives of styrene-isoprene and the like. Adhesives having Vicat softening point above 90° C. are preferred from the point of heat resistance.

The car interiors and the molded bodies for the car interiors especially the laminated foam sheets for the headliners and the molded headliners of heat resistance, can be produced in the reduced processes and cheaply by making Tg of the resin of the film layer lower than that of the resin in the foamed core layer, by keeping the deformation ratio of the length in the thickness direction, L1, at heating to 85° C. for 8 hours within 20% and by setting the film layer on only one side, especially on the room side (below side).

THE EXAMPLES

The present invention is further illustrated with reference to the following examples, but the present invention is not limited by these examples.

The resins used in the examples and in the comparisons are shown in table 1 and the other materials in table 2.

TABLE 1

| name of resin | | producer | PPE content weight % | PS content weight % | rubber content weight % |
|---|---|---|---|---|---|
| PPE resin | A | Noryl MX-4740 | GE plastics | 55 | 45 | — |
| PS resin | B | G-8102 | Asahi-Chem. | — | 100 | — |
| HIPS | C | D475 | Asahi-Chem. | — | 94 | 6 |
| Impact modifier | D | tough-prene 125 | Asahi-Chem. | — | 40 | 60 |

TABLE 2

| | Symbol | Producer | Grade | Thickness/μm |
|---|---|---|---|---|
| hot melt film | E | Kurabo | X-2200 | 70 |
| the surface materials | F | Toyobo | RH-95-300 | about 1000 |

In table 1, the PPE resin is a polymer of 2,6-dimethyl-1,4-phenyrene ether, polystyrene resin is polystyrene, HIPS is the high impact polystyrene and the impact modifier is the rubber of styrene-butadiene. In table 2, the hot melt film (E) is the hot melt film of polyolefins and the surface material is the non-woven cloths from polyethylene terephthalate fibers.

The heat resistance and compression ratio of the mounted headliners (the molded bodies of the laminated and secondary expanded foam sheet) in the examples and in the comparisons are estimated by the method described below.

The heat resistance test in the mounted states

The headliner [its size: 930 mm×1425, bent parts of the front (FIG. 2): 120°, the length from the center of the bent part (the point of the intersection of the extended line from the front for obtaining the angle and the extended line from the ceiling) and the front side: 15 mm] is mounted at the ceiling of the car and is fixed through sun visor·room mirror·room lump·garnish·pillar as in the same way as in the car. In the case that the film layer is laminated on only one side, the film layer is set at the side of the room. The 6 observed points are marked with an interval of 120 mm symmetrically to the center line of the molded body (a to f in FIG. 3). The vertical distance is measured by marking a line near the observed point in the front part. The absolute value of the deformation of the size in the vertical direction of the front part of the headliners is measured after keeping the ceiling part of the car mounted with the headliners in the constant temperature room held at 85° C. for 48 hours.

The glass transition temperature

The glass transition temperature is observed with using the DSC 200, produced by SEIKOU DENNSI KOGYO LTD., at the increasing speed of 10° C./min. according to JIS K-7121.

Izod strength

The Izod strength of the film layer is observed according to the ASTMMD 256.

Moldability of punching

The breakage of the film layer at punching time are observed as below;

◎: there is no breakage

○: breakage occurs sometimes but no real problems happen

Δ: there are more than one breakage but no real problems happen

Flame retardation

It is observed according to JIS-D1201 under the conditions that the decorative layer is laid below after the flat parts of the molded body are cut down.

The compression ratio t is calculated from the formula; the compression ratio= the thickness of the core layer of the molded body ,T, / the thickness of the core layer in the laminated and secondary expanded foam sheet ,t, after observing the thickness of the foamed core layer of the headliners, T, and the thickness of the foamed core layer of the foam sheet at the second expansion ,t,.

The observation of the cell size

The L1 and L2 are the averaged values on 30 cells by observing the length in the direction of the thickness of the cell, L1, and that of the width, L2, in the section of the molded body with using SEM. The same values are observes after heating the sample at 85° C. for 24 hours.

The deformation ratio of the cell in the direction of the thickness before and after the heat resistance test The deformation ratio of L1 in the direction of the thickness is calculated by (L1 before heating–L1 after heating at 85° C. for 24 hours)×100/ L1 before heating
The example 1—1

The mixture of 72.7 weight parts of modified PPE resin (A) and 27.3 weight part of the PS resin(B) shown in the table 1 was adjusted as the weight % of the PPE resin and PS resin becomes 40 and 60, respectively, and was blended in the extruder at 305° C. after 3 weight part of the foaming agent, the main component of which is the iso-butane (isobutane/n-butane =85/15), and 0.32 weight part of talc are added. Then, the mixture was cooled until the temperature of the resin became 198° C. and extruded through circular dies and rolled in a roll-like state at the speed of 8 m/min.

The foamed sheet obtained had a thickness of 2.3 mm, a width of 120 cm, expansion ratio of 10, ratio of closed cells of 85%, average cell diameter of 0.19 mm and weight of 240 g/m².

During pulling out the foamed sheet from the roll as the foamed core layer, the 150 μm thick film layer was laminated on one side of the foamed core layer by melting and mixing in the extruder and by extruding the 100 weight % of HIPS (C) (the rubber content of which is 6 weight %) with using T-die at 245° C. And further, the other side of the foamed core layer was laminated by the same way. Thus the laminated foam sheet with the film layer on both sides was obtained, its width and thickness of which were 120 cm and 2.6 mm respectively. The sheet obtained was cut.

The molded body of the headliners was obtained by clumping the four sides of the laminated foam sheets, by molding them using the die of 4.2 mm clearance kept at 60° C. by plug-molding after heating them in the oven for 60 sec. until the surface temperature of them reached to 135° C., by trimming through the mold of punching and by making holes. The thickness of the molded body was 3.9 mm in this case.

The laminated and secondary expanded foam sheet was obtained by cooling without plug-molding after heating the laminated foam sheet under the same condition. The thickness of the laminated and secondary expanded foam sheet was 5.5 mm (the thickness of the formed core layer ,t, was 5.2 mm).

The test results obtained on the molded headliners were as shown in the table 3.
The example 1-2

During pulling out the foamed sheet obtained in the example 1—1 from the roll as the foamed core layer, the laminated foam sheet of the width 120 cm and of the thickness 2.6 mm, both side of which were laminated with the film layers, was produced by melting and mixing in the extruder 13.6 weight part of the modified PPE resin (A), 76.4 weight part of PS resin (B) and the 10 weight part of the impact modifier (D) as the component of the PPE resin, PS resin and the rubber became 7.5 weight %, 86.5 weight % and 6 weight % respectively, by extruding them with using T-die at 255° C., by laminating them on the one side of the foamed core layer with 150 μm thick film layer and laminating them on the other side of the foamed core layer by the same method. The laminated foam sheet was cut.

The molded body of the headliners was obtained by clumping the four sides of the laminated foam sheet, by molding them with using the die of 4.2 mm clearance kept at 60° C. by plug-molding after heating them in the oven for 60 sec. until the surface temperature of them reached to 135° C., by trimming through the mold of punching and by making holes. The thickness of the molded body was 3.9 mm in this case.

The laminated and secondary expanded foam sheet was obtained by cooling without plug-molding after heating the laminated foam sheet under the same condition. The thickness of the laminated and secondary expanded foam sheet was 5.5 mm (the thickness of the foamed core layer was 5.2 mm).

The test results obtained on the molded body of the headliners were as shown in the table 3.
The example 1-3

During pulling out the foamed sheet obtained in the example 1—1 from the roll as the foamed core layer, the laminated foam sheet of the width 120 and of the thickness 2.6 mm, both sides of which were laminated with the film layers, was produced by melting and mixing in the extruder 27.3 weight part of the modified PPE resin (A), 62.7 weight part of PS resin(B) and the 10 weight part of the impact modifier (D) as the component of the PPE resin, PS resin and the modifier became 15 weight %, 79 weight % and 6 weight % respectively, by extruding them with using T-die at 270° C., by laminating them on the one side of the foamed core layer with 150 μm thick film layer and laminating them on the other side of the foamed core layer by the same method. The laminated foam sheet was cut.

The molded body of the headliners was obtained by clumping the four sides of the laminated foam sheets, by molding them with using the die of 4.2 mm clearance kept at 60° C. by the plug-molding after heating them in the oven for 60 sec. until the surface temperature of them reached to 135° C., by trimming through the mold of punching and by making holes. The thickness of the molded body was 3.9 mm. The laminated and secondary foam sheet was obtained by cooling without plug-molding after heating the laminated foam sheet under the same condition. The thickness of the laminated and secondly expanded foam sheet was 5.5 mm (the thickness of the foamed core layer was 5.2 mm).

The test results obtained on the molded body of the headliners were as shown in the table 3.
The example 1-4

During pulling out the foamed sheet obtained in the example 1—1 from the roll as the formed core layer, the laminated foam sheet of the width 120 cm and of the thickness 2.6 mm, both sides of which were laminated with the film layers, was produced by melting and mixing in the extruder 54.5 weight part of the modified PPE resin (A), 35.5 weight part of PS resin(B) and 10 weight part of the impact modifier(D) as the component of the PPE resin, PS resin and the modifier became 30 weight %, 64 weight % and 6 weight % respectively, by extruding them with using T-die at 285° C., by laminating them on the one side of the foamed core layer with 150 μm thick film layer and laminating them on the other side of the foamed core layer by the same method. The laminated foam sheet was cut.

The molded body of the headliners was obtained by clumping the four sides of the laminated foam sheet, by molding them with using the die of 4.2 mm clearance kept at 60° C. by the plug-molding after heating them in the oven for 60 sec. until the surface temperature of them reached to 135° C., by trimming through the mold of punching and by making holes. The thickness of the molded body was 3.9 mm.

The laminated and without y expanded foam sheet was obtained by cooling without plug-molding after heating the laminated foam sheet under the same condition. The thickness of the laminated and secondary expanded foam sheet was 5.5 mm (the thickness of the foamed core layer was 5.2 mm).

The test results obtained on the molded body of the headliners were shown in the table 3.

The example 1-5

After adding 3 weight part of the foaming agent, the main component of which is iso-butane (iso-butane/n-butane=84/15), and 0.32 weight part of talc to the modified PPE resin which was comprised from the 55 weight % of the PPE resin and 45 weight % of the PS resin and after mixing and blending them in the extruder at 305° C. and after cooling them until the temperature of the resin reached to 198° C., they were extruded from the circular dies and the open sheet was rolled round a reel at the speed of the 8 m/min..

The thickness and the width of the foamed sheet obtained were 2.3 mm and 120 cm, respectively, the first expansion ratio was 10, the ratio of the closed cells was 85%, the average cell size in the direction of the thickness was 0.17 mm, and the weight of its was 240 g/m².

During pulling out the foamed sheet obtained from the roll as the foamed core layer, the 150 μm thick film layer was laminated on the one side of the foamed core layer by melting and mixing the 100 weight % of HIPS (C) (the rubber content of which is 6 weight %) in the extruder and by extruding them with using T-die at 245° C. And further, the other side of the foamed core layer was laminated by the same way. Thus the laminated foam sheet with the film layer on both sides was obtained, its width and thickness of which were 120 cm and 2.6 mm respectively. The sheets obtained was cut.

The molded body of the headliners was obtained by clumping the four sides of the laminated foam sheets, by molding them with using the die of 4.2 mm clearance kept at 60° C. by the plug-molding after heating them in the oven for 60 sec. until the surface temperature of them reached to 135° C., by trimming through the mold of punching and by making holes. The thickness of the molded body was 3.9 mm.

The laminated and secondary expanded foam sheet was obtained by cooling without plug-molding after heating the laminated foam sheet under the same condition. The thickness of the laminated and secondary expanded foam sheet was 5.5 mm (the thickness of the foamed core layer was 5.2 mm).

The test results obtained on the molded body of the headliners were as shown in the table 3.

The example 1-6

During pulling out the foamed sheet obtained in the example 1-5 from the roll as the foamed core layer, the laminate foam sheet of the width 120 cm and of the thickness 2.6 mm, both sides of which were laminated with the film layers, was produced by melting and mixing in the extruder 13.6 weight part of the modified PPE resin (A), 76.4 weight part of PS resin (B) and 10 weight part of the impact modifier (D) as the component of the PPE resin, PS resin and the modifier became 7.5 weight %, 86.5 weight % and 6 weight % respectively, by extruding them with using T-die at 255° C., by laminating them on one side of the core layer with 150 μm thick film layer and laminating them on the other side of the foamed core layer by the same method. The laminated foam sheet was cut.

The molded body of the headliners was obtained by clumping the four sides of the laminated foam sheets, by molding them with using the die of 4.2 mm clearance kept at 60° C. by the plug-molding after heating them in the oven for 60 sec. until the surface temperature of them reached to 135° C., by trimming through the mold of punching and by making holes. The thickness of the shaped body was 3.9 mm.

The laminated and secondary expanded foam sheet was obtained by cooling without plug-molding after heating the laminated and foamed sheet under the same condition. The thickness of the laminated and secondary expanded foam sheet was 5.5 mm (the thickness of the formed core layer was 5.2 mm).

The test results obtained on the molded body of the headliners were as shown in the table 3.

The example 1-7

During pulling out the foamed sheet obtained in the example 1-5 from the roll as the foamed core layer, the laminate foam sheet of the width 120 cm and of the thickness 2.6 mm, both sides of which were laminated with the film layers, was produced by melting and mixing in the extruder 27.3 weight part of the modified PPE resin (A), 62.7 weight part of PS resin (B) and 10 weight part of the impact modifier (D) as the component of the PPE resin, PS resin and the modifier became 15 weight %, 79 weight % and 6 weight % respectively, by extruding them with using T-die at 270° C., by laminating them on the one side of the foamed core layer with 150 μm thick film layer and laminating them on the other side of the foamed core layer by the same method. The laminated foam sheet was cut.

The molded body of the headliners was obtained by clumping the four sides of the laminated foam sheets, by molding them with using the die of 4.2 mm clearance kept at 60° C. by the plug-molding after heating them in the oven for 60 sec. until the surface temperature of them reached to 135° C., by trimming through the mold of punching and by making holes. The thickness of the molded body was 3.9 mm.

The laminated and secondary expanded foam sheet was obtained by cooling without plug-molding after heating the laminated foam sheet under the same condition. The thickness of the laminated and secondary expanded foam sheet was 5.5 mm (the thickness of the foamed core layer was 5.2 mm).

The test results obtained on the molded body of the headliners were as shown in the table 3.

Example 1-8

During pulling out the foamed sheet obtained in the example 1-5 from the roll as the foamed core layer, the first laminated foam sheet of the width 120 cm and of the thickness 2.6 mm, both sides of which were laminated with the film layers, was produced by melting and mixing in the extruder 54.5 weight part of the modified PPE resin (A), 35.5 weight part of PS resin (B) and 10 weight part of the impact modifier (D) as the component of the PPE resin, PS resin and the modifier became 30 weight %, 64 weight % and 6 weight% respectively, by extruding them with using T-die at 285° C., by laminating them on the one side of the foamed core layer with 150 μm thick film layer and laminating them on the other side of the foamed core layer by the same method. The laminated foam sheet was cut.

The molded body of the headliners was obtained by clumping the four sides of the laminated foam sheets, by molding them with using the die of 4.2 mm clearance kept at 60° C. by the plug-molding after heating them in the oven for 60 sec. until the surface temperature of them reached to 135° C., by trimming through the mold of punching and by making holes. The thickness of the shaped body was 3.9 mm.

The laminated and secondary expanded foam sheet was obtained by cooling without plug-molding after heating the laminated foam sheet under the same condition. The thickness of the laminated and secondary expanded foam sheet was 5.5 mm (the thickens of the foamed core layer was 5.2 mm).

The test results obtained on the molded body of the headliners were as shown in the table 3.

The example 1-9

During pulling out the foamed sheet obtained in the example 1—1 from the roll as the foamed core layer, the first laminate foam sheet of the width 120 cm and of the thickness 2.5 mm, the only one side of which was laminated with the film layers, was produced by melting and mixing in the extruder 100 weight % of HIPS(C) and by extruding it with using T-die at 245° C. and by laminating 150 μm thick film layer on the one side of the foamed core layer. The laminated foam sheet obtained was cut.

The molded body of the headliners was obtained by clumping the four sides of the laminated foam sheet, by molding them with using the die of 4.1 mm clearance kept at 60° C. by the plug-molding after heating them in the oven for 60 sec. until the surface temperature of them reached to 135° C., by trimming through the mold of punching and by making holes. The thickness of the shaped body was 3.9 mm.

The laminated and secondly expanded foam sheet was obtained by cooling without plug-molding after heating the laminated foam sheet under the same condition. The thickness of the laminated and secondary expanded foam sheet was 5.4 mm (the of the foamed core layer was 5.2 mm).

The tested results obtained on the molded body of the headliners were shown in the table 3.

The example 1-10

During pulling out the foamed sheet obtained in the example 1—1 from the roll as the foamed core layer, the laminated foam sheet of the width 120 cm and of the thickness 2.5 mm the only one side of which was laminated with the film layers, was produced by melting and mixing in the extruder 54.5 weight part of the modified PPE resin (A), 35.5 weight part of PS resin (B) and 10 weight part of the impact modifier (D) as the component of the PPE resin, PS resin and the modifier became 30 weight %, 64 weight % and 6 weight % respectively and by extruding them with using T-die at 285° C., by laminating them on one side of the foamed core layer with 150 μm thick film layer. The laminated foam sheet was cut.

The molded body of the headliners was obtained by clumping the four sides of the laminated foam sheets, by molding them with using the die of 4.1 mm clearance kept at 60° C. by the plug-molding after heating them in the oven for 60 sec. until the surface temperature of them reached to 135° C., by trimming through the mold of punching and by making holes. The thickness of the molded body was 3.9 mm.

The laminated and secondary foam sheet was obtained by cooling without plug-molding after heating the laminated foam sheet under the same condition. The thickness of the laminated and secondary expanded foam sheet was 5.4 mm (the thickness of the foamed core layer was 5.2 mm).

The test results obtained on the molded body of the headliners were as shown in the table 3.

Reference for comparison 1—1

Using the same method as the example 1—1, the foamed sheet was obtained The thickness, the width, the first expansion ratio, the ratio of the closed cell, the average cell size and the weight of it were 2.3 mm, 120 cm, 10, 85%, 0.19 mm and 240g/m², respectively.

The molded body of the headliners was obtained by clumping the four sides of the laminated foam sheet, by molding them with using the die of 3.9 mm clearance kept at 60° C. by the plug-molding after heating them in the oven for 60 sec. until the surface temperature of them reached to 135° C., by trimming through the mold of punching and by making holes. The thickness of the molded body was 3.9 mm.

The laminated and secondary expanded foamed sheet was obtained by cooling without plug-molding after heating the laminated and foamed sheet under the same condition. The thickness of the laminated and secondary expanded foam sheet was 5.2 mm (the thickness of the foamed core layer was 5.2 mm).

The test results obtained on the molded body of the headliners were as shown in the table 3.

The reference 1-2 for comparison

During pulling out the foamed sheet obtained in the example 1-1 from the roll as the foamed core layer, the first laminated foam sheet of the width 120 cm and of the thickness 2.6 mm, both sides of which were laminated with the film layers, was produced by melting and mixing in the extruder 89.1 weight part of the modified PPE resin (A), 0.9 weight part of PS resin (B) and 10 weight part of the impact modifier (D) as the component of the PPE resin, PS resin and the rubber became 49 weight %, 45 weight % and 6 weight % respectively and by extruding them with using T-die at 285° C. and by laminating them on one side of the foamed core layer with 150 μm thick film layer and by laminating them on the other side of the foamed core layer by the same method The laminated foam sheet was cut.

The molded body of the headliners was obtained by clumping the four sides of the laminated foam sheets, by molding them with using the die of 4.2 mm clearance kept at 60° C. by the plug-molding after heating them in the oven for 60 sec. until the surface temperature of them reached to 135° C., by trimming through the mold of punching and by making holes. The thickness of the molded body was 3.9 mm.

The laminated and secondary expanded foam sheet was obtained by cooling without plug-molding after heating the laminated foam sheet under the same condition. The thickness of the laminated and secondary foam sheet was 5.5 mm (the thickness of the foamed core layer was 5.2 mm).

The test results obtained on the molded body of the headliners were as shown in the table 3.

The reference for the comparison 1-3

During pulling out the foamed sheet obtained in the example 1—1 from the roll as the foamed core layer, the laminate foam sheet of the width 120 cm and of the thickness 2.5 mm, only one side of which was laminated with the film layers, was produced by melting and mixing in the extruder 89.1 weight part of the modified PPE resin (A), 0.9 weight part of PS resin (B) and 10 weight part of the impact modifier (D) as the component of the PPE resin, PS resin and the rubber became 49 weight %, 45 weight % and 6 weight % respectively and by extruding them with using T-die at 285° C. and by laminating them on one side of the foamed core layer with 150 μm thick film layer and by laminating them on the other side of the foamed core layer by the same method. The laminated foam sheet was cut.

The molded body of the headliners was obtained by clumping the four sides of the laminated foam sheet, by molding them with using the die of 4.1 mm clearance kept at 60° C. by the plug-molding after heating them in the oven for 60 sec. until the surface temperature of them reached to 135° C., by trimming through the mold of punching and by making holes. The thickness of the molded body was 3.9 mm.

The laminated and secondary expanded foam sheet was obtained by cooling without plug-molding after heating the laminated and foamed sheet under the same condition. The thickness of the laminated and secondary expanded foam sheet was 5.4 mm (the thickness of the foamed core layer was 5.2 mm). The test results obtained on the molded body of the headliners were as shown in the table 3.

The reference for the comparison 1-4

After adding 3 weight part of the nuclear agent, the main component of which is the iso-butane (iso-butane/n-butane=84/15), and 0.2 weight part of talc to the PS resin after mixing and blending them in the extruder at 280° C. and after cooling them until the temperature of the resin reached to 150° C., they were extruded from the circular dies and the open sheet was rolled round a reel at the speed of 8m/min.

The thickness and the width of the foamed sheet obtained were 2.3 mm and 120 cm, respectively, the expansion ratio was 10, the ratio of the closed cells was 85%, the average cell size in the direction of the thickness was 0.13 mm and the weight was 240 g/m².

During pulling out the foamed sheet obtained from the roll as the foamed core layer, the 150 μm thick film layer was laminated on one side of the foamed core layer by melting and mixing the 100 weight % of HIPS (C) (the rubber content of which is 6 weight %) in the extruder and by extruding them with using T-die at 245° C. And further, the other side of the foamed core layer was laminated by the same way. Thus the laminated foam sheet with the film layer on both sides was obtained, its width and thickness of which were 120 cm and 2.6 mm respectively. The sheets obtained was cut.

The molded body of the headliners was obtained by clumping the four sides of the laminated foam sheets, by molding them with using the die of 4.2 mm clearance kept at 60° C. by the plug-molding after heating them in the oven for 60 sec. until the surface temperature of them reached to 125° C., by trimming through the mold of punching and by making holes. The thickness of the molded body was 3.9 mm.

The laminated and secondary expanded foam sheet was obtained by cooling without plug-molding after heating the laminated foam sheet under the same condition. The thickness of the laminated and secondary expanded foam sheet was 5.5 mm (the thickness of the foamed core layer was 5.2 mm).

The test results obtained on the molded body of the headliners were as shown in the table 3.

TABLE 3

| | Foamed Layer PPE Ratio (%) | Foamed Layer Tg (° C.) | Laminate Faces | Film Layer PPE Ratio (%) | Film Layer Tg (° C.) | Deformation (mm) |
|---|---|---|---|---|---|---|
| Example 1-1 | 40 | 135 | both | 0 | 103 | 1.5 |
| Example 1-2 | 40 | 135 | both | 7.5 | 110 | 1.5 |
| Example 1-3 | 40 | 135 | both | 15 | 117 | 1.5 |
| Example 1-4 | 40 | 135 | both | 30 | 127 | 2.0 |
| Example 1-5 | 55 | 155 | both | 0 | 103 | 1.0 |
| Example 1-6 | 55 | 155 | both | 7.5 | 110 | 1.0 |
| Example 1-7 | 55 | 155 | both | 15 | 117 | 1.0 |
| Example 1-8 | 55 | 155 | both | 30 | 127 | 1.0 |
| Example 1-9 | 40 | 135 | one | 0 | 103 | 1.5 |
| Example 1-10 | 40 | 135 | one | 30 | 127 | 1.5 |
| Comparative 1-1 | 40 | 135 | none | — | — | 6.0 |
| Comparative 1-2 | 40 | 135 | both | 49 | 155 | 5.0 |
| Comparative 1-3 | 40 | 135 | one | 49 | 155 | 5.5 |
| Comparative 1-4 | 0 | 103 | one | 0 | 103 | 10.0 |

The example 2-1

After adding 3 weight part of the nuclear agent, the main component of which is iso-butane (iso-butane/n-butane=84/15), and 0.32 weight part of talc to the resin which was comprised from 40 weight % of the PPE resin and 60 weight % of the PS resin by mixing 72.7 weight part of the modified PPE resin(A) and 27.3 weight part of PS resin (B), and after mixing and blending them in the extruder at 305° C. and after cooling them until the temperature of the resin reached to 198° C., they were extruded from the circular dies and the open sheet was rolled round a reel at the speed of 8 m/min.

The thickness and the width of the foamed sheet obtained were 2.3 mm and 120 cm, respectively, the expansion ratio was 10, the ratio of the closed cells was 85%, the average cell size in the direction of the thickness was 0.19 mm, and the weight was 240 g/M².

During pulling out the foamed sheet obtained from the roll as the foamed core layer, the 150 μm thick film layer was laminated on one side of the foamed core layer by melting and mixing 83.3 weight % of HIPS (C) and 16.7 weight % of the impact modifier (15 weight % of the total rubber content) in the extruder and by extruding them with using T-die at 245° C. And further, the other side of the foamed core layer was laminated by the same way. Thus the first laminated and foamed sheets with the film layer on both sides was obtained, its width and thickness of which were 120 cm and 2.6 mm respectively. The sheets obtained was cut.

The hot melt film was heat-laminated on the laminated foam sheet mentioned before.

The molded body of the headliners was obtained by clumping the four sides of the laminated foam sheets, on which the decorative materials in table 2 was set temporarily through the hot melt film, and by molding them with using the die of 5.2 mm clearance kept at 60° C. by the plug-molding after heating them in the oven for 60 sec. until the surface temperature of them reached to 135° C. and by trimming through the mold of punching and by making holes. The thickness of the molded body was 3.9 mm.

The laminated and secondary expanded foam sheet was obtained by cooling without plug-molding after heating the laminated foam sheet under the same condition. The thickness of the laminated and secondary expanded foam sheet was 5.5 mm (the thickness of the foamed core layer was 5.2 mm).

The test results obtained on the molded body of the headliners were as shown in the table 4.

Example 2—2

During pulling out the foamed sheet obtained with using the same method as the example 2-1 from the roll as the foamed core layer, a 150 μm thick film layer was laminated on one side of the foamed core layer by melting and mixing 100 weight % of HIPS (C) (the rubber content of which was 6 weight %) in the extruder and by extruding them with using T-die at 245° C. And further, the other side of the foamed core layer was laminated by the same way. Thus the laminated foam sheet with the film layer on both sides was obtained, its width and thickness of which were 120 cm and 2.6 mm respectively. The sheets obtained was cut.

The hot melt film was heat-laminated on the laminated foam sheet mentioned before.

The molded body of the headliners was obtained by clumping the four sides of the laminated foam sheet, on which the decorative materials in table 2 was set temporarily through the hot melt film, and by molding them with using the die of 5.2 mm clearance kept at 60° C. by the plug-molding after heating them in the oven for 60 sec. until the surface temperature of them reached to 135° C. and by trimming through the mold of punching and by making holes. The thickness of the molded body was 3.9 mm.

The laminated and secondary expanded foam sheet was obtained by cooling without plug-molding after heating the laminated foam sheet under the same condition. The thickness of the laminated and secondary expanded foam sheet was 5.5 mm (the thickness of the foamed core layer was 5.2 mm).

The test results obtained on the molded body of the headliners were as shown in the table 4.

The example 2-3

During pulling out the foamed sheet obtained with using the same method as the example 2-1 from the roll as the foamed core layer, a 150 μm thick film layer was laminated on one side of the foamed core layer by melting and mixing 100 weight % of PS resin (B) (the rubber content of which was 0 weight %) in the extruder and by extruding them with using T-die at 245° C. And further, the other side of the foamed core layer was laminated by the same way. Thus the laminated foam sheets with the film layer on both sides was obtained, its width and thickness of which were 120 cm and 2.6 mm respectively. The sheets obtained was cut.

The hot melt film was heat-laminated on the laminated foam sheet mentioned before.

The molded body of the headliners was obtained by clumping the four sides of the laminated foam sheet, on which the decorative materials in table 2 was set temporarily through the hot melt film, and by molding them with using the die of 5.2 mm clearance kept at 60° C. by the plug-molding after heating them in the oven for 60 sec. until the surface temperature of them reached to 135° C. and by trimming through the mold of punching and by making holes. The thickness of the molded body was 3.9 mm.

The laminated and secondary expanded foam sheet was obtained by cooling without plug-molding after heating the laminated foam sheet under the same condition. The thickness of the laminated and secondary expanded foam sheet was 5.5 mm (the thickness of the foamed core layer was 5.2 mm).

The test results obtained on the molded body of the headliners were as shown in the table 4.

Example 2-4

During pulling out the foamed sheet obtained with using the same method as the example 2-1 from the roll as the foamed core layer, the 150 μm thick film layer was laminated on one side of the foamed core layer by melting and mixing 100 weight part of HIPS resin (C) (the rubber content of which was 6 weight %) and 3 weight part of tetrabromobisphenol A in the extruder and by extruding them with using T-die at 245° C. And further, the other side of the foamed core layer was laminated by the same way. Thus the laminated foam sheets with the film layer on both sides was obtained, its width and thickness of which were 120 cm and 2.6 mm respectively. The sheets obtained was cut.

The hot melt film was heat-laminated on the laminated foam sheet mentioned before.

The molded body of the headliners was obtained by clumping the four sides of the laminated foam sheet, on which the decorative materials in table 2 was set temporarily through the hot melt film, and by molding them with using the die of 5.2 mm clearance kept at 60° C. by the plug-molding after heating them in the oven for 60 sec. until the surface temperature of them reached to 135° C. and by trimming through the mold of punching and by making holes. The thickness of the molded body was 3.9 mm.

The laminated and secondary expanded foam sheet was obtained by cooling without plug-molding after heating the laminated foam sheet under the same condition. The thickness of the laminated and secondary expanded foam sheet was 5.5 mm (the thickness of the foamed core layer was 5.2 mm).

The test results obtained on the molded body of the headliners were as shown in the table 4.

Example 2-5

During pulling out the foamed sheet obtained with using the same method as the example 2-1 from the roll as the foamed core layer, the 150 μm thick film layer was laminated on one side of the foamed core layer by melting and mixing 54.5 weight part of the modified PPE resin (A) and 35.5 weight part of the PS resin (B) and 10 weight part of the impact modifier (D) as the components of the PPE resin, PS resin and rubber became 30, 64 and 6 weight %, respectively, in the extruder and by extruding them with using T-die at 285° C. And further, the other side of the foamed core layer was laminated by the same way. Thus the laminated foam sheet with the film layer on the both side was obtained, its width and thickness of which were 120 cm and 2.6 mm respectively. The sheets obtained was cut.

The hot melt film was heat-laminated on the laminated foam sheet mentioned before.

The molded body of the headliners was obtained by clumping the four sides of the laminated foam sheets, on which the decorative materials in table 2 was set temporarily through the hot melt film, and by molding them with using the die of 5.2 mm clearance kept at 60° C. by the plug-molding after heating them in the oven for 60 sec. until the surface temperature of them reached to 135° C. and by trimming through the mold of punching and by making holes. The thickness of the molded body was 3.9 mm.

The laminated and secondary expanded foam sheet was obtained by cooling without plug-molding after heating the laminated foam sheet under the same condition. The thickness of the laminated and secondary expanded foam sheet was 5.5 mm (the thickness of the foamed core layer was 5.2 mm).

The test results obtained on the molded body of the headliners were as shown in the table 4.

The example 2-6

During pulling out the foamed sheet obtained with using the same method as the example 2-1 from the roll as the foamed core layer, a 150 μm thick film layer was laminated on one side of the foamed core layer by melting and mixing 54.5 weight part of the modified PPE resin (A) and 35.5 weight part of the PS resin (B) and 10 weight part of the impact modifier (D) as the components of the PPE resin, PS resin and rubber became 30, 64 and 6 weight %, respectively, in the extruder and by extruding them with using T-die at 285° C. Thus the laminated foam sheet with the film layer on only one side was obtained, its width and thickness of which were 120 cm and 2.6 mm respectively. The sheets obtained was cut.

The hot melt film was heat-laminated on the laminated foam sheet mentioned before.

The molded body of the headliners was obtained by clumping the four sides of the laminated foamed sheet, on which the decorative materials in table 2 was set temporarily through the hot melt film, and by molding them with using the die of 5.1 mm clearance kept at 60° C. by the plug-molding after heating them in the oven for 60 sec. until the surface temperature of them reached to 135° C. and by trimming through the mold of punching and by making holes. The thickness of the molded body was 3.9 mm.

The laminated and secondary expanded foam sheet was obtained by cooling without plug-molding after heating the laminated foam sheet under the same condition. The thickness of the laminated and secondary expanded foam sheet was 5.5 mm (the thickness of the foamed core layer was 5.2 mm).

The test results obtained on the molded body of the headliners were as shown in the table 4.

TABLE 4

| example | foamed layer PPE ratio (%) | foamed layer Tg (° C.) | laminated faces | film layer PPE ratio (%) | film layer Tg (° C.) | rubber content (%) | Izod strength (J/m) | fire retardant | punching moldability | flammability | deformation (mm) |
|---|---|---|---|---|---|---|---|---|---|---|---|
| 2-1 | 40 | 135 | both | 0 | 103 | 15 | 140 | none | ⊙ | 55 | 1.5 |
| 2-2 | 40 | 135 | both | 0 | 103 | 6 | 88 | none | ○ | 60 | 1.5 |
| 2-3 | 40 | 135 | both | 0 | 103 | 0 | 18 | none | Δ | 58 | 1.5 |
| 2-4 | 40 | 135 | both | 0 | 127 | 6 | 85 | brominated comp. | ○ | self-extinguishing | 2.0 |
| 2-5 | 40 | 135 | both | 30 | 127 | 6 | 155 | none | ⊙ | 50 | 2.0 |
| 2-6 | 40 | 135 | one | 30 | 127 | 6 | 155 | none | ⊙ | self-extinguishing | 2.0 |
| 2-7 | 40 | 135 | one | 30 | 127 | 6 | 152 | Phosphoric comp. | ⊙ | self-extinguishing | 2.0 | through the hot melt film, and by molding them with using the die of 5.1 mm clearance kept at 60° C. by the plug-molding after heating them in the oven for 60 sec. until the surface temperature of them reached to 135° C. and by trimming through the mold of punching and by making holes. The thickness of the molded body was 3.9 mm.

The laminated and secondary expanded foam sheet was obtained by cooling without plug-molding after heating the laminated foam sheet under the same condition. The thickness of the laminated and secondary expanded foam sheet was 5.4 mm (the thickness of the foamed core layer was 5.2 mm).

The test results obtained on the molded body of the headliners were as shown in the table 4.

Example 2-7

During pulling out the foamed sheet obtained with using the same method as the example 2-1 from the roll as the foamed core layer, a 150 μm thick film layer was laminated on one side of the foamed core layer by melting and mixing 54.5 weight part of the modified PPE resin (A), 35.5 weight part of the PS resin (B), 10 weight part of the impact modifier (D) and further 3 weight part of trimethylphosphate as the components of the PPE resin, PS resin and rubber became 30, 64 and 6 weight %, respectively, in the extruder and by extruding them with using T-die at 285° C. And further, the other side of the foamed core layer was laminated by the same way. Thus the laminated foam sheets with the film layer on both sides was obtained, its width and thickness of which were 120 cm and 2.6 mm respectively. The sheets obtained was cut.

The hot melt film was heat-laminated on the laminated foam sheet mentioned before.

The molded body of the headliners was obtained by clumping the four sides of the laminated foam sheets on which the decorative materials in table 2 was set temporarily through the hot melt film, and by shaping them with using the die of 5.2 mm clearance kept at 60° C. by the plug-molding after heating them in the oven for 60 sec. until the surface temperature of them reached to 135° C. and by trimming through the mold of punching and by making holes. The thickness of the molded body was 3.9 mm.

The laminated and secondary expanded foam sheet was obtained by cooling without plug-molding after heating the laminated foam sheet under the same condition. The thickness of the laminated and secondary expanded foam sheet was 5.5 mm (the thickness of the foamed core layer was 5.2 mm).

The test results obtained on the molded body of the headliners were as shown in the table 4.

The example 3-1

After adding 3 weight part of the nuclear agent, the main component of which is iso-butane (iso-butane/n-butane=84/15), and 0.32 weight part of talc to 100 weight part of the resin, which was comprised from 40 weight % of the PPE resin and 60 weight % of the PS resin by mixing 72.7 weight part of the modified PPE resin (A) and 27.3 weight part of PS resin (B), and after mixing and blending them in the extruder at 305° C. and after cooling them until the temperature of the resin reached to 198° C., they were extruded from the circular dies and the open sheet was rolled round a reel at the speed of 8 m/min.

The thickness and the width of the foamed sheet obtained were 2.3 mm and 120 cm, respectively, the first expansion ratio was 10, the ratio of the closed cells was 85%, the average cell size in the direction of the thickness was 0.19 mm, and the weight was 240 g/M$^2$.

During pulling out the foamed sheet obtained from the roll as the foamed core layer, the 150 μm thick film layer was laminated on one side of the foamed core layer by melting and mixing the 54.6 weight part of the modified PPE resin, 35.5 weight part of the PS resin and 10 weight part of the impact modifier, as the component of the PPE resin, PS resin and rubber became 30, 64 and 6 weight % respectively, in the extruder and by extruding them with using T-die at 245° C. And further, the other side of the foamed core layer was laminated by the same way. Thus the laminated foam sheets with the film layer on both sides was obtained, its width and thickness of which were 120 cm and 2.6 mm respectively. The sheets obtained was cut.

The molded body of the headliners was obtained by clumping the four sides of the laminated foam sheets and by molding them with using the die of 4.2 mm clearance kept at 60° C. by the plug-molding after heating them in the oven for 60 sec. until the surface temperature of them reached to 135° C. and by trimming through the mold of punching and by making holes. The thickness of the molded body was 3.9 mm.

The laminated and secondary expanded foam sheet was obtained by cooling without plug-molding after heating the laminated foam sheet under the same condition. The thickness of the laminated and secondary expanded foam sheet was 5.5 mm (the thickness of the foamed core layer was 5.2 mm).

The test results obtained on the molded body of the headliners were as shown in the table 5.

The example 3-2

The molded body of the headliners was obtained by clumping the four sides of the laminated foam sheet with using the same method as in the example 3-1 and by molding them with using the die of 5.2 mm clearance kept at 60° C. by the plug-molding after heating them in the oven for 60 sec. until the surface temperature of them reached to 135° C. and by trimming through the mold of punching and by making holes. The thickness of the molded body was 4.9 mm.

The laminated and secondary expanded foam sheet was obtained by cooling without plug-molding after heating the laminated foam sheet under the same condition. The thickness of the laminated and secondary expanded foam sheet was 5.5 mm (the thickness of the foamed core layer was 5.2 mm).

The test results obtained on the molded body of the headliners were as shown in the table 5.

Example 3—3

The molded body of the headliners was obtained by clumping the four sides of the laminated foam sheets with using the same method as in the example 3-1 and by molding them with using the die of 3.5 mm clearance kept at 60° C. by the plug-molding after heating them in the oven for 60 sec. until the surface temperature of them reached to 135° C. and by trimming through the mold of punching and by making holes. The thickness of the molded body was 3.2 mm.

The laminated and secondary expanded foam sheet was obtained by cooling without plug-molding after heating the laminated foam sheet under the same condition. The thickness of the laminated and secondary expanded foam sheet was 5.5 mm (the thickness of the foamed core layer was 5.2 mm).

The test results obtained on the molded body of the headliners were as shown in the table 5.

Example 3-4

After adding 3 weight part of the nuclear agent, the main component of which is iso-butane (iso-butane/n-butane=84/15), and 0.32 weight part of talc to 100 weight part of the resin, which was comprised from 40 weight % of the PPE resin and 60 weight % of the PS resin by mixing 72.7 weight part of the modified PPE resin (A) shown in table 1 and 27.3 weight part of PS resin (B) and after mixing and blending them in the extruder at 305° C. and after cooling them until the temperature of the resin reached to 198° C., they were extruded from the circular dies and the open sheet was rolled round a reel at the speed of 8 m/min.

The thickness and the width of the foamed sheet obtained were 1.8 mm and 120 cm, respectively, the expansion ratio was 10, the ratio of the closed cells was 85%, the average cell size in the direction of the thickness was 0.15 mm, and the weight of its was 190 g/m$^2$.

During pulling out the foamed sheet obtained from the roll as the foamed core layer, the 150 $\mu$m thick film layer was laminated on one side of the foamed core layer by melting and mixing 54.6 weight part of the modified PPE resin, 35.5 weight part of the PS resin and 10 weight part of the impact modifier, as the component of the PPE resin, PS resin and rubber became 30, 64 and 6 weight %, respectively, in the extruder and by extruding them with using T-die at 245° C. And further, the other side of the foamed core layer was laminated by the same way. Thus the laminated foam sheets with the film layer on both sides was obtained, its width and thickness of which were 120 cm and 2.1 mm respectively. The sheets obtained was cut.

The molded body of the headliners was obtained by clumping the four sides of the laminated foam sheets and by molding with using the die of 4.2 mm clearance kept at 60° C. by the plug-molding after heating them in the oven for 60 sec. until the surface temperature of them reached to 135° C. and by trimming through the mold of punching and by making holes. The thickness of the molded body was 3.9 mm.

The laminated and secondary expanded foam sheet was obtained by cooling without plug-molding after heating the laminated foam sheet under the same condition. The thickness of the laminated and secondary expanded foam sheet was 4.5 mm (the thickness of the foamed core layer was 4.2 mm).

The test results obtained on the molded body of the headliners were as shown in the table 5.

Example 3-5

After adding 2.7 weight part of the nuclear agent, the main component of which is iso-butane (iso-butane/n-butane=84/15), and 0.32 weight part of talc to 100 weight part of the resin which was comprised from 40 weight % of the PPE resin and 60 weight % of the PS resin by mixing 72.7 weight part of the modified PPE resin (A) and 27.3 weight part of PS resin (B), and after mixing and blending them in the extruder at 305° C. and after cooling them until the temperature of the resin reached to 198° C., they were extruded from the circular dies and the open sheet was rolled round a reel at the speed of 8 m/min.

The thickness and the width of the foamed sheet obtained were 2.1 mm and 120 cm, respectively, the expansion ratio was 10, the ratio of the closed cells was 85%, the average cell size in the direction of the thickness was 0.17 mm, and the weight was 245 g/m$^2$.

During pulling out the foamed sheet obtained from the roll as the foamed core layer, the 150 $\mu$m thick film layer was laminated on the one side of the foamed core layer by melting and mixing 54.6 weight part of the modified PPE resin, 35.5 weight part of the PS resin and 10 weight part of the impact modifier, as the component of the PPE resin, PS resin and rubber became 30, 64 and 6 weight %, respectively, in the extruder and by extruding them with using T-die at 245° C. And further, the other side of the foamed core layer was laminated by the same way. Thus the laminated foam sheets with the film layer on both sides was obtained, its width and thickness of which were 120 cm and 2.3 mm respectively. The sheets obtained was cut.

The molded body of the headliners was obtained by clumping the four sides of the laminated foam sheets and by molding them with using the die of 4.2 mm clearance kept at 60° C. by the plug-molding after heating them in the oven for 60 sec. until the surface temperature of them reached to 135° C. and by trimming through the mold of punching and by making holes. The thickness of the molded body was 3.9 mm.

The laminated and secondary expanded foam sheet was obtained by cooling without plug-molding after heating the laminated foam sheet under the same condition. The thickness of the laminated and secondary expanded foam sheet was 4.5 mm (the thickness of the foamed core layer was 4.2 mm).

The test results obtained on the molded body of the headliners were as shown in the table 5.

TABLE 5

| example | foamed layer PPE ratio (%) | film layer PPE ratio (%) | thickness of foamed layer of molded body T (mm) | thickness of foamed layer without die t (mm) | compression ratio T/t | cell size before heat resist. L1 (mm) | cell size before heat resist. L2 (mm) | cell size after heat resist test. L1 | cell size after heat resist test. L2 | deformation ratio of the cell in the direction of the thickness before and after heat resist. test (%) | the ratio of L1/L2 | deformation (mm) max. |
|---|---|---|---|---|---|---|---|---|---|---|---|---|
| 3-1 | 40 | 30 | 3.9 | 5.2 | 0.75 | 0.30 | 0.63 | 0.32 | 0.66 | 7 | 0.48 | 2.0 |
| 3-2 | 40 | 30 | 4.9 | 5.2 | 0.94 | 0.37 | 0.60 | 0.38 | 0.65 | 3 | 0.62 | 1.0 |
| 3-3 | 40 | 30 | 3.2 | 5.3 | 0.61 | 0.25 | 0.62 | 0.29 | 0.67 | 16 | 0.40 | 2.5 |
| 3-4 | 40 | 30 | 3.9 | 4.3 | 0.91 | 0.28 | 0.52 | 0.29 | 0.55 | 4 | 0.53 | 1.5 |
| 3-5 | 40 | 30 | 3.9 | 4.3 | 0.91 | 0.29 | 0.48 | 0.30 | 0.53 | 3 | 0.60 | 1.5 |

We claim:

1. A laminated foam sheet for a vehicle interior comprising a foamed core layer and at least one film layer laminated on said foamed core layer, said foamed core layer comprising modified polyphenylene ether resin composition (I) comprising polyphenylene ether and polystyrene, said at least one film layer being a thermoplastic resin having a glass transition temperature which is lower than the glass transition temperature of said modified polyphenylene ether resin composition (I), said thermoplastic resin comprising a polystyrene resin.

2. A laminated foam sheet as recited in claim 1, wherein said polystyrene resin is a high-impact polystyrene.

3. A laminated foam sheet as recited in claim 1, wherein said at least one film layer further comprises at least one impact modifier.

4. A laminated foam sheet as recited in claim 1, wherein said at least one film layer has an Izod strength of above 80 J/m.

5. A laminated foam sheet as recited in claim 1, wherein said at least one film layer further comprises flame retardant.

6. A laminated foam sheet as recited in claim 1, wherein said modified polyphenylene ether resin composition(I) comprises polyphenylene ether in an amount not less than 35 weight % and below 75 weight %.

7. A laminated foam sheet as recited in claim 1, further comprising an adhesive layer provided on an outer surface of said at least one film layer.

8. A laminated foam sheet as recited in claim 1, wherein said foamed core layer has a thickness in the range of from 1 to 5 mm, an expansion ratio in the range of from 3 to 20, an average cell size in the range of from 0.05 to 0.9 mm, and a closed cell ratio of above 70%.

9. A laminated foam sheet as recited in claim 1, wherein said at least one film layer is laminated on only one side of the foamed core layer.

10. A laminated foam sheet as recited in claim 9, further comprising a hot adhesive layer provided on at least a surface of said at least one film layer.

11. A thermoformed molded body comprising a foamed core layer and at least one film layer laminated on said foamed core layer, said foamed core layer comprising modified polyphenylene ether resin composition (I), said modified polyphenylene ether resin composition comprising polyphenylene ether and polystyrene, said at least one film layer being a thermoplastic resin having a glass transition temperature which is lower than the glass transition temperature of said modified polyphenylene ether resin composition (I), said thermoplastic resin comprising a polystyrene resin.

12. A thermoformed molded body as recited in claim 11, wherein said polystyrene resin is a high-impact polystyrene.

13. A thermoformed molded body as recited in claim 11, wherein said at least one film layer further comprises at least one impact modifier.

14. A thermoformed molded body as recited in claim 11, wherein said at least one film layer has an Izod strength of above 80 J/m.

15. A thermoformed molded body as recited in claim 11, wherein said at least one film layer further comprises flame retardant.

16. A thermoformed molded body as recited in claim 11, wherein said modified polyphenylene ether resin composition(I) comprises polyphenylene ether in an amount not less than 35 weight % and below 75 weight %.

17. A thermoformed molded body as recited in claim 11, further comprising a hot melt adhesive layer provided on an outer surface of said at least one film layer.

18. A thermoformed molded body as recited in claim 11, wherein said foamed core layer has a thickness in the range of from 2 to 10 mm, an expansion ratio in the range of from 5 to 50, an average cell size in the range of 0.07 to 2.0 mm, and a closed cell ratio of above 60%.

19. A thermoformed molded body as recited in claim 11, wherein said foamed core layer has a deformation ratio of the cell length (L1) in the direction of thickness of below 20% after heating them at 85° C. for 8 hours.

20. A thermoformed molded body as recited in claim 11, wherein said foamed core layer has a ratio of L1/L2 of between 0.3 and 1.0, where L1 is the cell length in the direction of the thickness of the foamed core layer and L2 is the cell length in the direction of width of the foamed core layer.

21. A thermoformed molded body as recited in claim 11, wherein said foamed core layer has a thickness T and a secondary expanded thickness t which satisfy the relation, T≧0.5 t.

22. A thermoformed molded body as recited in claim 17, further comprising a decorative layer attached to said thermoformed molded body by said adhesive layer.

23. A thermoformed molded body as recited in claim 11, wherein said molded body is a headliner for an automobile.

24. A thermoformed molded body as recited in claim 23, wherein said at least one film layer is laminated on only one side of the foamed core layer, and said at least one film layer is arranged to face a room side of said automobile.

* * * * *